United States Patent
Farnham

(10) Patent No.: US 9,411,038 B2
(45) Date of Patent: Aug. 9, 2016

(54) DYNAMIC COMPENSATION FOR WIRELESS DEVICE LOCATION DETERMINATION

(71) Applicant: Kabushiki Kaisha Toshiba, Minato-ku (JP)

(72) Inventor: Timothy David Farnham, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 694 days.

(21) Appl. No.: 13/753,967

(22) Filed: Jan. 30, 2013

(65) Prior Publication Data

US 2013/0194135 A1    Aug. 1, 2013

(30) Foreign Application Priority Data

Jan. 30, 2012 (GB) .................................. 1201539.2

(51) Int. Cl.
*G01S 5/02* (2010.01)

(52) U.S. Cl.
CPC .............. *G01S 5/021* (2013.01); *G01S 5/0252* (2013.01)

(58) Field of Classification Search
CPC ................ G01S 5/02; G01S 5/04; G01S 5/12
USPC ............. 342/450, 453, 463; 455/456.1, 456.2
See application file for complete search history.

(56) References Cited

U.S. PATENT DOCUMENTS

| | | | |
|---|---|---|---|
| 8,275,544 B1 * | 9/2012 | Wells ................... | G01C 21/165 342/146 |
| 2010/0130229 A1 | 5/2010 | Sridhara et al. | |
| 2011/0163917 A1 | 7/2011 | Lundgren et al. | |

FOREIGN PATENT DOCUMENTS

| | | |
|---|---|---|
| EP | 1 542 492 A1 | 6/2005 |
| EP | 2 249 172 A1 | 11/2010 |
| EP | 2 293 104 A2 | 3/2011 |
| JP | 2003-279362 | 10/2003 |
| JP | 2009-109241 A | 5/2009 |

OTHER PUBLICATIONS

United Kingdom Search Report Issued May 29, 2012, in Great Britain Patent Application No. 1201539.2, filed Jan. 30, 2012.
Office Action issued Dec. 3, 2013, in Japanese Patent Application No. 2013-015175 with English translation.

* cited by examiner

*Primary Examiner* — Dao Phan
(74) *Attorney, Agent, or Firm* — Oblon, McClelland, Maier & Neustadt, L.L.P.

(57) ABSTRACT

Determining a location estimate of a wireless communications device can depend on the dynamic and/or static state of the device. Compensation processing is applied to a location estimate (or to information from which such an estimate is derived, in use) if required, given the dynamic and/or static state of the device.

13 Claims, 3 Drawing Sheets

DYNAMIC COMPENSATION FOR WIRELESS DEVICE LOCATION DETERMINATION

FIELD

Embodiments described herein relate to the determination of location of a wireless device.

BACKGROUND

Many existing approaches for determining device location based on Wireless techniques (such as signal strength measurements) aim to achieve high location accuracy in the presence of measurement errors that are often treated as random processes.

DETAILED DESCRIPTION

Figure 1:
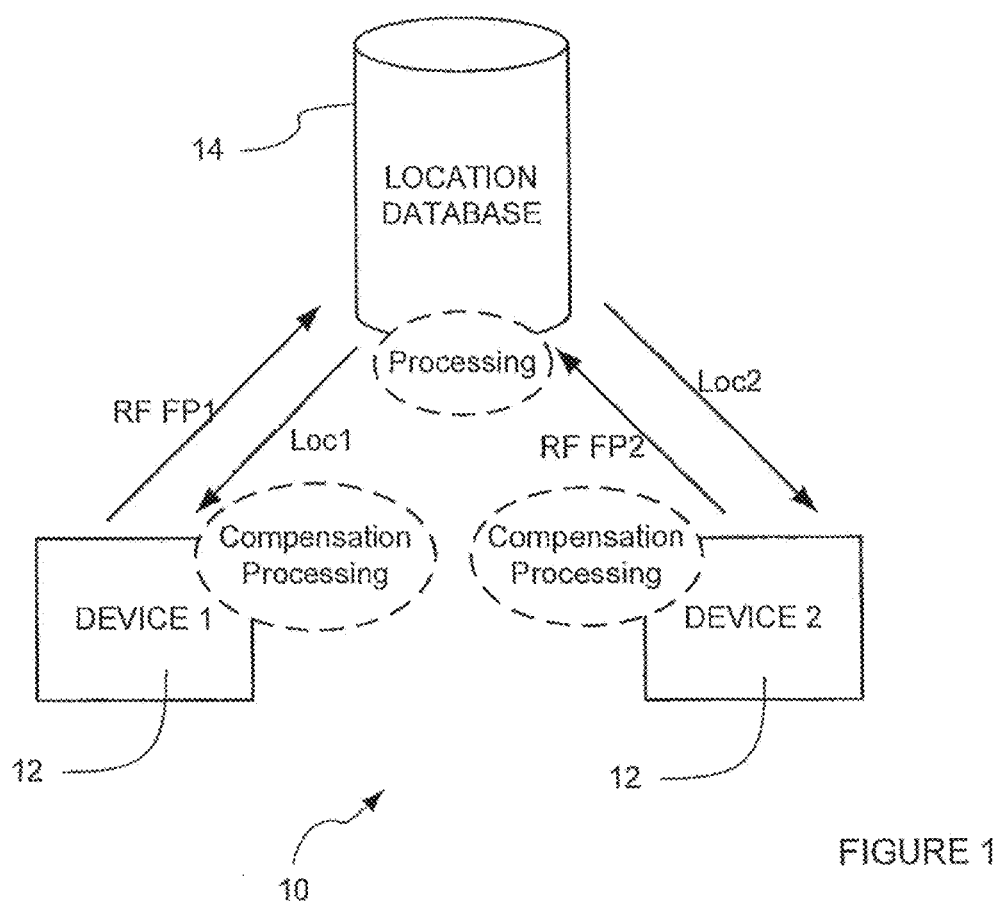
FIG. 1 is a schematic diagram of a network arranged to implement an embodiment described herein.

Embodiments described herein exploit knowledge of the orientation/attitude/movement of a handheld device, in relation to the user and its environment in order to dynamically adapt a location determination process.

Embodiments described herein use device orientation/attitude information to dynamically adapt device wireless location determination methods and compensation employed.

Compass/accelerometer based orientation and/or attitude determination methods can be employed. WiFi location determination methods (such as relative signal strength trilateration techniques) can be employed. Motion determination can be used, together with the previous approaches, to calculate the appropriate compensation to apply. Relative signal level (RF coverage) maps can be used together with the above techniques.

Embodiments described herein take account of the ability of a device to ascertain its orientation and attitude (and optionally motion) and from this to estimate dynamically the compensation to apply to a location determination process in the context of the device/user.

Embodiments described herein can suitably be implemented on tablets and other handheld or portable devices equipped with orientation/attitude and other sensors (such as digital compass & accelerometers).

In this way location error and its variance can, in certain implementations of an embodiment described herein, be reduced and so overall fewer measurements and recalculations would be required.

Several techniques are conventionally used for location determination, such as GPS, RFID, IR, Ultrasound and wireless network based techniques. The wireless network based solutions are either infrastructure based (i.e. relying on direction or angle of arrival and time difference of arrival techniques) or terminal based (typically relying on signal strength techniques).

The basic techniques outlined above all have disadvantages such as a need for infrastructure support or special sensing devices. Also, they tend to suit different environments (such as GPS or infrastructure based wireless techniques for outdoor used, and terminal based wireless techniques for indoor use). The performance of the different techniques is normally specified as a location determination error. Another important characteristic is the time taken to resolve the location to a specified accuracy as most techniques tend to improve over time.

Some existing approaches attempt to improve accuracy and/or resolution times by combining different techniques. A classic technique is assisted GPS which is implemented in most smart phones. This tends to combine the infrastructure based wireless location determination technique with a GPS sensor to provide a faster and more accurate determination of location. However, such a technique does not work well indoors or where there is no GPS or wireless infrastructure support.

The current Wifi based location determination methods (such as provided by Google latitude etc.) rely on initially correlating WiFi access point (AP) measurement vectors (that form a fingerprint) with GPS location data and subsequently permitting a reverse database lookup process. This technique and similar approaches that rely on signal strength suffer from the noise and fading/shadowing effects that reduce the accuracy of these schemes. Techniques to improve accuracy involve careful selection of AP sets to use (i.e. the strongest AP signals) and also longer term analysis of data to average out variations. Relative and incremental techniques tend to perform better when there are slowly moving devices (as the noise and manufacturing errors tend to be correlated) and the initial location resolution time is less important than the ability to track the device movements.

The approach employed in embodiments described herein facilitates exploitation of knowledge of orientation of the device by calculating a compensation taking account of the device bearing, attitude and other factors (such as movement). The refinement can then take advantage of the context of the device and so may directly adapt the process used to determine location.

FIG. 1 illustrates an arrangement of electronic devices operable to communicate with each other to form a network 10. The network 10 comprises two handheld devices 12, each of which is in communication with a hub 14 establishing a location database. As illustrated, each device 12 is able to effect two-way communication with the hub 14. The reader will appreciate that a wide variety of communications will be effected in both directions; for the purpose of this disclosure only those communications relevant to the disclosure are illustrated and described.

Each device 12 is effective to transmit to the location database held at the hub 14 a message containing RF fingerprint information (RF FP1, RF FP2) for look up against information held in the location database. In response, the hub 14 is operable to process RF fingerprint information from each device 12 and to return a location message (Loc1, Loc2) to the respective device 12.

The compensation processing indicated in FIG. 1 refers to processing steps operable to determine the local orientation, attitude and movement of the device 12 to determine the compensation to be applied to the fingerprint information (RF FP2) sent to the location database or alternatively the returned location information (Loc1) received from the location database.

The fine tuning/processing at the device 12 uses compensation based on orientation, attitude and movement alongside incremental wireless location determination methods. Optionally, means are provided not only to take into account device orientation, and therefore the signal variations that it causes, but also to take into account other factors such as device attitude (i.e. pitch, yaw and roll).

All conventional techniques for location determination have the drawback of reliance on noisy sensor data. To improve location accuracy requires more samples over a longer period of time (leading to long location resolution times) or combination of several techniques (such as assisted GPS) with a coarse location refined by a smaller GPS location search space. A typical approach in satellite navigation (sat-nav) receivers is for coarse location to be effected together with speed and direction tracking to be used to refine and speed up the location determination process.

However, previous approaches that exploit scanning of wireless networks (such as WiFi location determination methods) consider noise to be random or indeterminate and so do not apply local compensations that can exploit fine-grained sensor data (such as orientation, attitude and movement data) to adapt and compensate the determination process. Instead, they average out the variations over a certain time period (assuming that they are time dependent).

Figure 2:
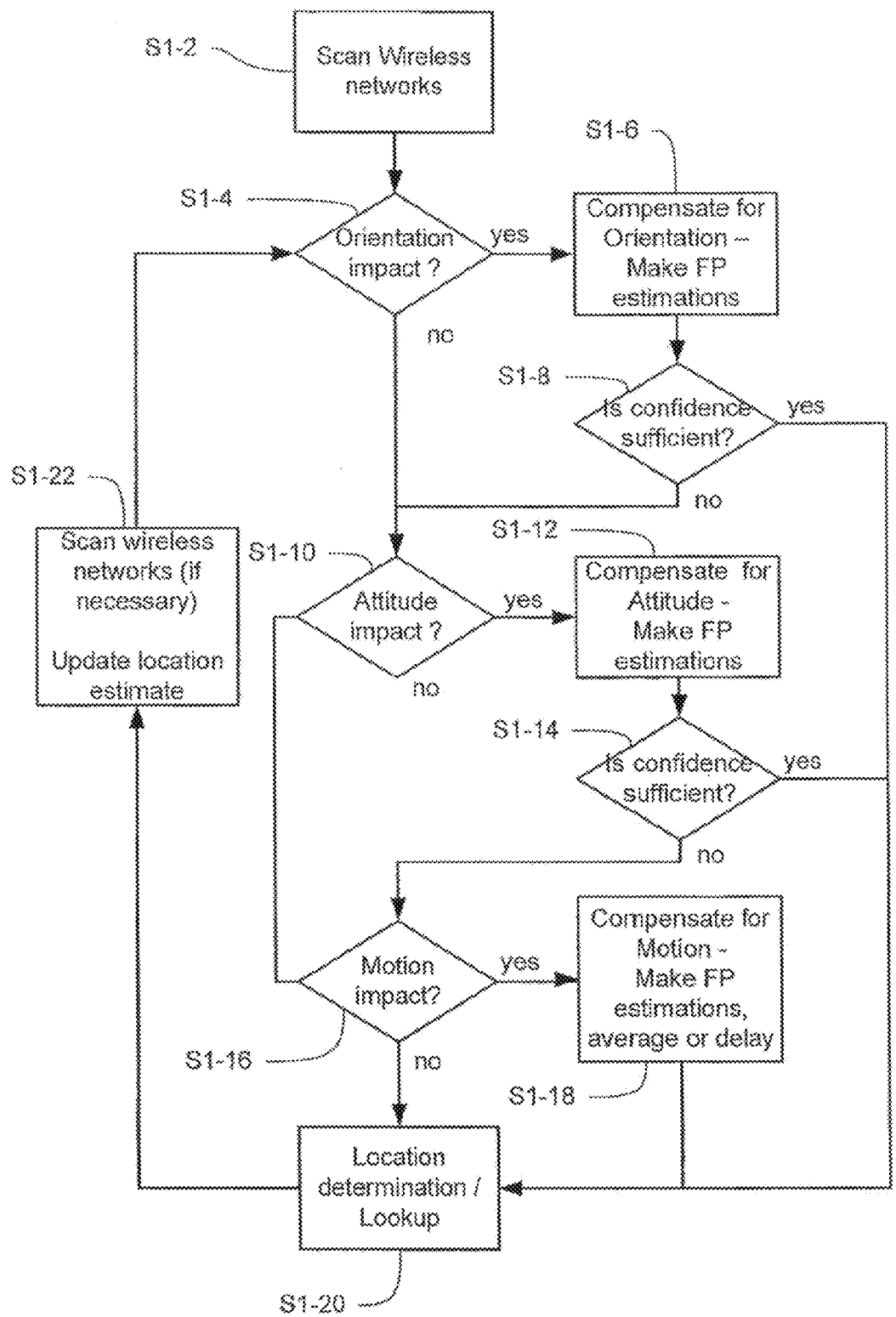
FIG. 2 illustrates a flow diagram of a method performed by a device of the network illustrated in FIG. 1.

Embodiments as disclosed herein can be implemented such that they can be used both outdoors and indoors where GPS is not available, and can also provide more rapid and accurate or power efficient location determination, potentially with lower overall processing. A method as implemented by an embodiment is illustrated by way of a flow chart as set out in FIG. 2. This method takes account of the context of the device and user.

The first step (S1-2) is the same as prior art approaches in that the device scans wireless networks signal strength.

Next, the device checks (S1-4) if orientation has an impact on the signal levels received from local access points such as hub 14. Orientation compensation compensates for absolute orientation of the device. This compensation (for instance) will increase the signal levels of access points that are determined to be impacted (i.e. have an impact on signal strength measurements) by the device orientation. The amount of the compensation corresponds to the estimated impact that can be determined by a calibration process. Step S1-6 implements orientation compensation if necessary.

Step S1-8 then determines if the level of confidence that can now be applied to the location estimate compensated for orientation is above a sufficiency threshold. If it is, then other compensating techniques are not used, and the process of location estimation continues on the basis of only orientation compensation. Otherwise, in step S1-10, the device 12 determines whether the attitude of the device needs to be compensated for. For instance, if the device 12 is being held in a certain way, this will also impact on the signal strength measurements. If it is, then in step S1-12, attitude compensation is applied. Again, in step S1-14, a determination is made as to the confidence that can be applied to location information compensated for attitude—if the compensated location information has a high confidence associated therewith, then further compensation steps are omitted.

Otherwise, the next step (S1-16) determines whether there is a need to apply motion compensation. For instance, compensation may be applied based on estimated or predicted motion of the device. It is well known that fading caused by slight movements cause signal strength variations that can lead to spurious location determination (as a result of signal fading patterns). If so, then step S1-18 applies this compensation. Conversely, if the device is considered to be stationary then the probability there will be no signal variations (or fewer variations as it may also depend on other objects moving in the vicinity) and so compensation according to step S1-18 can be skipped. If the confidence level at this point is deemed to be sufficiently high then no other compensation is necessary. Also, observation of signal variations over time can also be used to correlate with motion to determine if the rapid signal strength variations that are due to movement and so compensation may be simply to take more frequent measurements and average out variations over a time window (i.e. smooth based on time period of variations) when there is determined to be motion.

The final location determination can now take place (step S1-20) based on the measured signal levels at the last location with the relevant compensations applied.

The method loops on the basis of a repeat scan of the networks, if necessary, in step S1-22 and an update of the location estimate on the basis of the determination performed in step S1-20.

While the above embodiment envisages applying compensation to a derived location estimate, the reader will appreciate that compensation could be applied to information on the basis of which that location estimate is derived. For instance, if the above technique is combined with signal processing based location estimating, the signals on the basis of which location is estimated could themselves be subject to compensation as described above.

In an alternative embodiment it would be possible for the terminal device to send local context data (such as orientation, attitude and movement estimates) to a remote entity to perform the compensation processing operation. However, in that case, calibration data might also need to be sent.

Use of the described embodiment could also imply a reduction in network overhead of conventional lookup based wireless location identification (for fine grain location determination) by reducing the required frequency of lookups and subsequent averaging.

Figure 3:
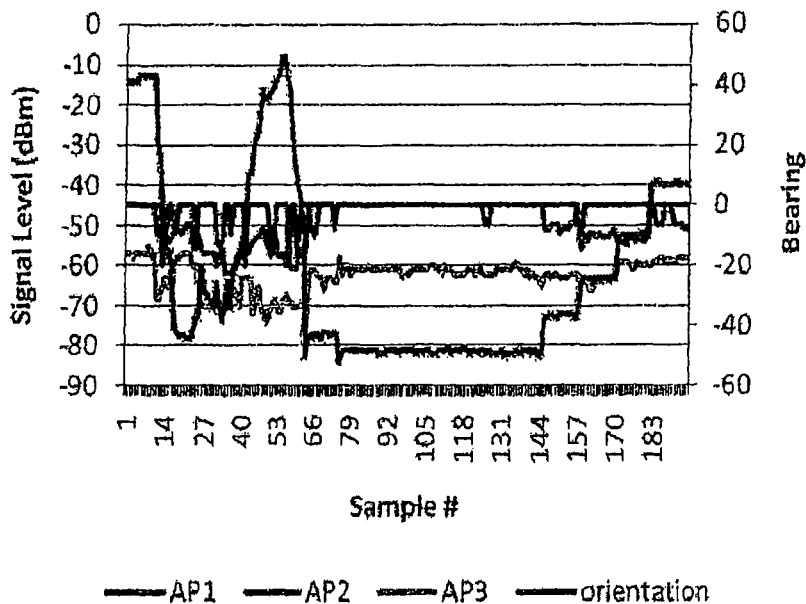
FIG. 3 is a graph of results of performance of a method in accordance with a prior art arrangement.
Figure 4:
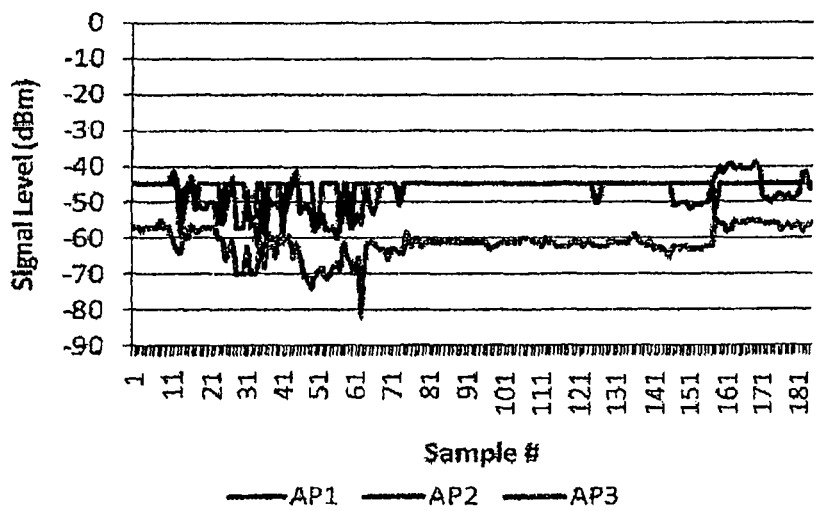
FIG. 4 is a graph of results of performance of a specific example of an embodiment as described herein.

Measurement results have been acquired for an exemplary existing system and an embodiment as described herein. The measurement results set out in FIGS. 3 and 4 indicate the benefit which may be obtained from a particular implementation of the presently described approach. Firstly, a prior art approach without the compensation would use fingerprints comprising of the signal levels recorded for the three strongest AP signals. These are affected by the orientation (due to shadowing and antenna patterns) of the device and so an associated error will be introduced into the location result, which are then conventionally averaged out over time or by using more AP measurements.

Instead of this, the above described embodiment uses a simple calibration process (which could, in one approach, be determined analytically), that takes the measurement results corresponding to a constant location but with varying bearing—i.e. commensurate with a user/device turning around on the spot. The calibration compensation is then defined as a set of rules to apply during the compensation process. In this case the derived rules are:

IF{ABS(bearingAP2)<30}compensation=ABS(bearing)/2

And

IF{ABS(bearingAP3)<30}compensation=ABS(bearing)/3 for the AP2 and AP3 signals respectively.

The AP1 signal has no compensation applied to it as it is determined that the variance is too small for compensation. More complex expressions can also be derived.

Device attitude compensation (in three axes) can also be applied in the same manner with a set of rules. However, it may be determined (through calibration or analysis) that the rules focus only on a certain axis (i.e. pitch):

IF{attitude.y>45}compensation+=ABS(bearingAP)/4

The reader will understand that it is further possible to combine both orientation and attitude in a rule.

Different methods for resolving the signal levels into a location estimate can then be used. Conventional techniques exist based on "lateration", which involves finding closest matches with an existing database of fingerprints or maps (i.e. using clustering or probabilistic methods). One technique that can be optionally exploited is to compute relative signal level maps that can be analytical (based on known AP locations and power levels) or derived from real measurements. The lookup process can then be limited to the region around the last known location estimate for the device and closest matching fingerprint found.

The search process can start at a tile around the last known location and increase in size if necessary.

A further extension is possible with the device if it needs to compute the relative bearing (with respect to AP location) in the compensation process with existing (prior art) location database solutions. The steps involve spoofing the location to be close to the each AP to infer their relative orientations with respect to the device location and then to make a request for the real device location with the appropriate orientation compensation applied. However, this incurs the penalty of more lookups and so should ideally not be repeated frequently, only when new APs become visible and attractive to utilise.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless communications device operable to determine a location estimate representative of a location of the device with respect to a location reference frame, the device comprising:
   a compensation determining unit determining a requirement for compensation with regard to dynamic and/or static state of the device, and operable to determine a compensation to be applied if required;
   a compensation applying unit operable to apply, if required, a determined compensation to derive a location estimate compensated for dynamic and/or static state of the device;
   a signal detection unit operable to detect the presence of detectable signals from location reference frame defining devices, and operable to detect signal strength of detected signals;
   the device being operable to send, to a location determining device, a signal bearing information on signals detected by said wireless communications device, for said location determining device to determine a location estimate for location of said device, said wireless communications device being operable to receive a signal bearing information on a location estimate determined by said location determining device.

2. A wireless communications device in accordance with claim 1 and comprising an orientation determining unit determining orientation of the device with respect to an orientation reference frame, wherein the compensation determining unit comprises an orientation compensation requirement determining unit operable to determine impact of the orientation on a determined location estimate with respect to a threshold and, in the event that orientation compensation is determined to be required, the compensation applying unit is operable to apply an orientation impact compensation.

3. A wireless communications device in accordance with claim 1 and further comprising an attitude determining unit operable to determine attitude of the device with respect to an attitude reference frame, and an attitude compensation requirement determining unit operable to determine an impact of attitude on a determined location estimate with respect to a threshold and, in the event that compensation is determined to be required, the compensation applying unit is operable to apply an attitude impact compensation.

4. A wireless communications device in accordance with claim 1 and further comprising a motion determining unit operable to determine motion of the device, and a motion compensation requirement determining unit operable to determine an impact of motion on a determined location estimate with respect to a threshold and wherein, in the event that compensation is determined to be required, the compensation applying unit is operable to apply a motion impact compensation.

5. A wireless communications device in accordance with claim 1 wherein the compensation applying unit is operable to apply a determined compensation to a determined location estimate.

6. A wireless communications device in accordance with claim 1 operable to apply compensation to said detected signal strengths.

7. A method of determining a location estimate representative of a location of a wireless communications device with respect to a location reference frame, comprising:
   determining a requirement for compensation of a location estimate with regard to dynamic and/or static state of the device;
   determining a compensation to apply to a location estimate if required, and applying, if required, a compensation to a location estimate to derive a location estimate compensated for dynamic and/or static state of the device;
   detecting the presence of detectable signals from location reference frame defining devices, and detecting signal strength of detected signals; and
   sending, to a location determining device, a signal bearing information on signals detected by said device, for said location determining device to determine a location estimate for location of said device, and receiving a signal bearing information on a location estimate determined by said location determining device.

8. A method in accordance with claim 7 and comprising determining orientation of the device with respect to an orientation reference frame, wherein the compensation requirement determining comprises determining impact of the orientation on a determined location estimate and applying an orientation impact compensation if said orientation impact exceeds a threshold.

9. A method in accordance with claim 7 and further comprising determining attitude of the device with respect to an attitude reference frame, wherein the compensation requirement determining comprises determining an impact of attitude on a determined location estimate and applying an attitude impact compensation if said attitude impact exceeds a threshold.

10. A method in accordance with claim 7 and further comprising determining motion of the device, wherein the compensation requirement determining comprises determining an impact of motion on a determined location estimate and applying a motion impact compensation if said motion impact exceeds a threshold.

11. A method in accordance with claim 7 wherein the determined compensation is applied to a determined location estimate.

12. A method in accordance with claim 7 and comprising applying compensation to said detected signal strengths, thereby compensating said location estimate.

13. A non-transitory computer program product comprising computer executable instructions operable, when executed by a general purpose computerised wireless communications device, to cause that device to perform a method in accordance with claim 7.

* * * * *